United States Patent
Eshima et al.

(10) Patent No.: US 11,017,284 B2
(45) Date of Patent: *May 25, 2021

(54) RFID TAG

(71) Applicant: Murata Manufacturing Co., Ltd., Nagaokakyo (JP)

(72) Inventors: Kazuki Eshima, Nagaokakyo (JP); Noboru Kato, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/021,300

(22) Filed: Sep. 15, 2020

(65) Prior Publication Data

US 2020/0410315 A1 Dec. 31, 2020

Related U.S. Application Data

(63) Continuation of application No. 16/256,398, filed on Jan. 24, 2019, now Pat. No. 10,817,771, which is a (Continued)

(30) Foreign Application Priority Data

Dec. 2, 2016 (JP) .............................. JP2016-235372

(51) Int. Cl.
*G06K 19/077* (2006.01)
*G06K 19/02* (2006.01)
(Continued)

(52) U.S. Cl.
CPC ....... *G06K 19/07783* (2013.01); *G06K 19/02* (2013.01); *G06K 19/025* (2013.01);
(Continued)

(58) Field of Classification Search
CPC ........ G06K 19/00; G06K 16/04; G06K 19/06; G06K 19/07
(Continued)

(56) References Cited

U.S. PATENT DOCUMENTS 6,427,065 B1 7/2002 Suga et al.
2007/0285246 A1 12/2007 Koyama
(Continued)

FOREIGN PATENT DOCUMENTS

JP 2009206974 A 9/2009
JP 2013080324 A 5/2013
(Continued)

OTHER PUBLICATIONS

International Search Report issued for PCT/JP2017/042774, dated Feb. 20, 2018.
(Continued)

*Primary Examiner* — Edwyn Labaze
(74) *Attorney, Agent, or Firm* — Arent Fox LLP

(57) ABSTRACT

A highly reliable RFID tag is provided that is lighter and smaller and has a desired communication distance, and that can be applied to deformable articles. The RFID tag includes a first end of a first power feeding coil that is connected to a first input and output terminal of an RFIC element, a second end of the first power feeding coil that is connected to one end of a second power feeding coil, and the other end of the second power feeding coil is connected to a second input and output terminal of the RFIC element. Moreover, the RFID tag has a spring-shaped antenna that has a first region with magnetic field coupling of the first power feeding coil, and a second region with magnetic field coupling of the second power feeding coil. The first region and the second region are continuous via a region having an inductance component.

19 Claims, 14 Drawing Sheets

Related U.S. Application Data continuation of application No. PCT/JP2017/042774, filed on Nov. 29, 2017.

(51) Int. Cl.
*H01Q 9/26* (2006.01)
*H01Q 1/22* (2006.01)
*H01Q 1/40* (2006.01)
*H01Q 1/36* (2006.01)
*H01Q 7/00* (2006.01)

(52) U.S. Cl.
CPC ..... *G06K 19/077* (2013.01); *G06K 19/07794* (2013.01); *H01Q 1/2216* (2013.01); *H01Q 1/2225* (2013.01); *H01Q 1/36* (2013.01); *H01Q 1/40* (2013.01); *H01Q 7/00* (2013.01); *H01Q 9/26* (2013.01)

(58) Field of Classification Search
USPC .................................. 235/492, 375, 380, 487
See application file for complete search history.

(56) References Cited

U.S. PATENT DOCUMENTS

| | | | |
|---|---|---|---|
| 2011/0043050 A1* | 2/2011 | Yabe | .................... H04B 5/0087 |
| | | | 307/104 |
| 2011/0122045 A1 | 5/2011 | Seo et al. | |
| 2015/0145342 A1 | 5/2015 | Chiyo et al. | |

FOREIGN PATENT DOCUMENTS

| | | |
|---|---|---|
| JP | 2013222264 A | 10/2013 |
| JP | 2014067234 A | 4/2014 |

OTHER PUBLICATIONS

Written Opinion of the International Searching Authority issued for PCT/JP2017/042774, dated Feb. 20, 2018.

* cited by examiner

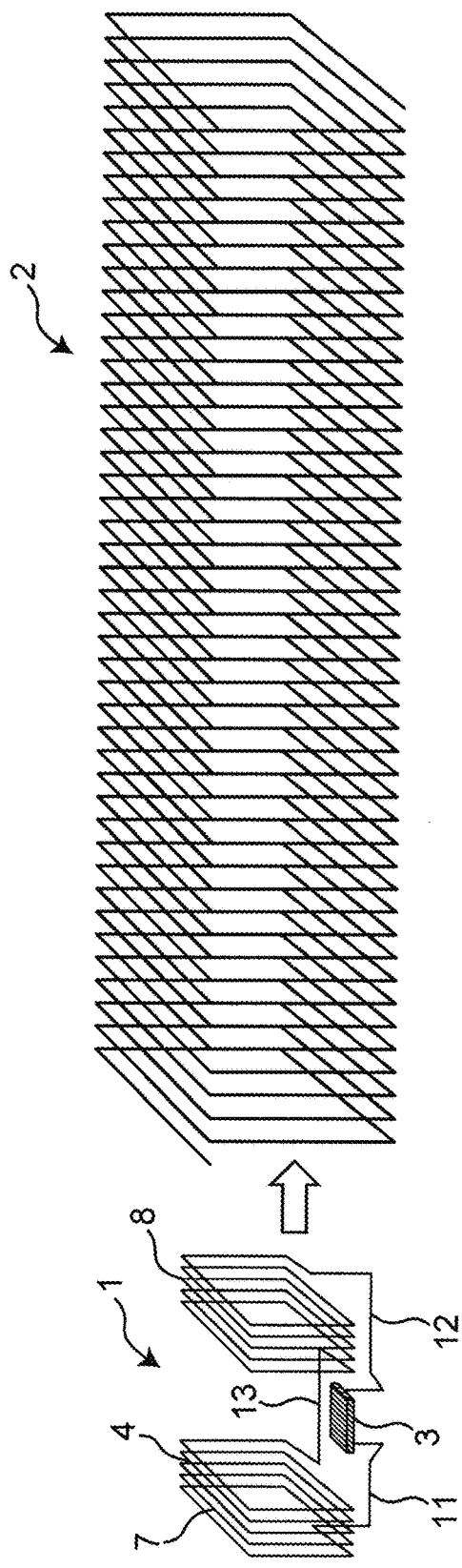
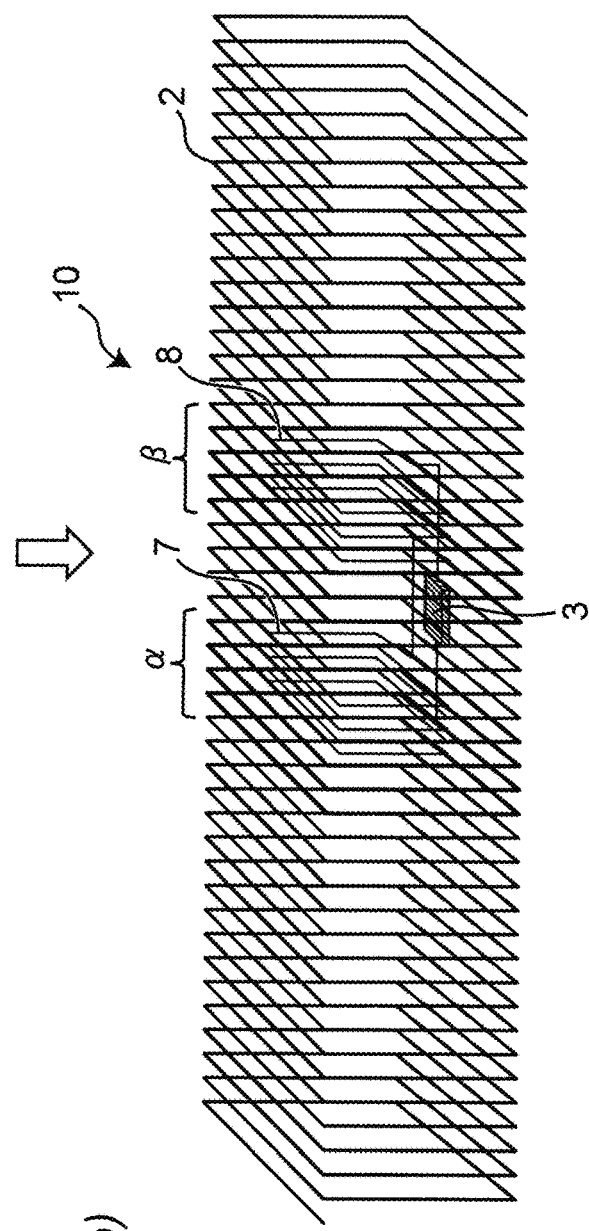

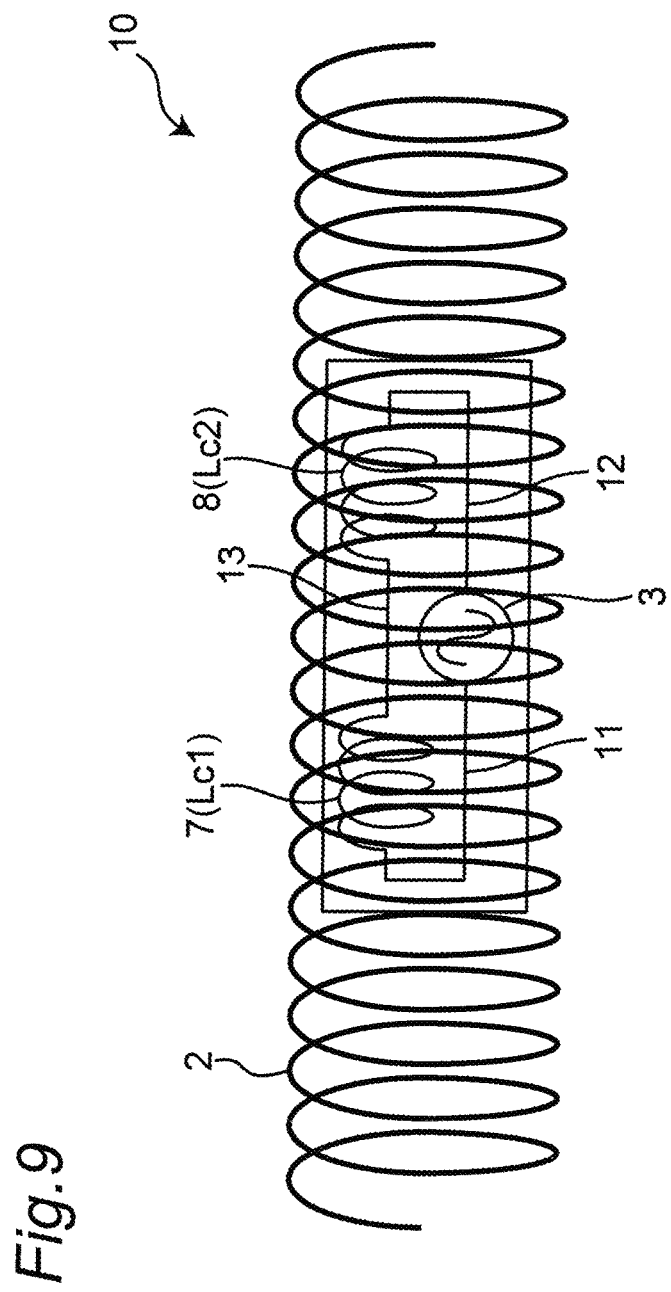

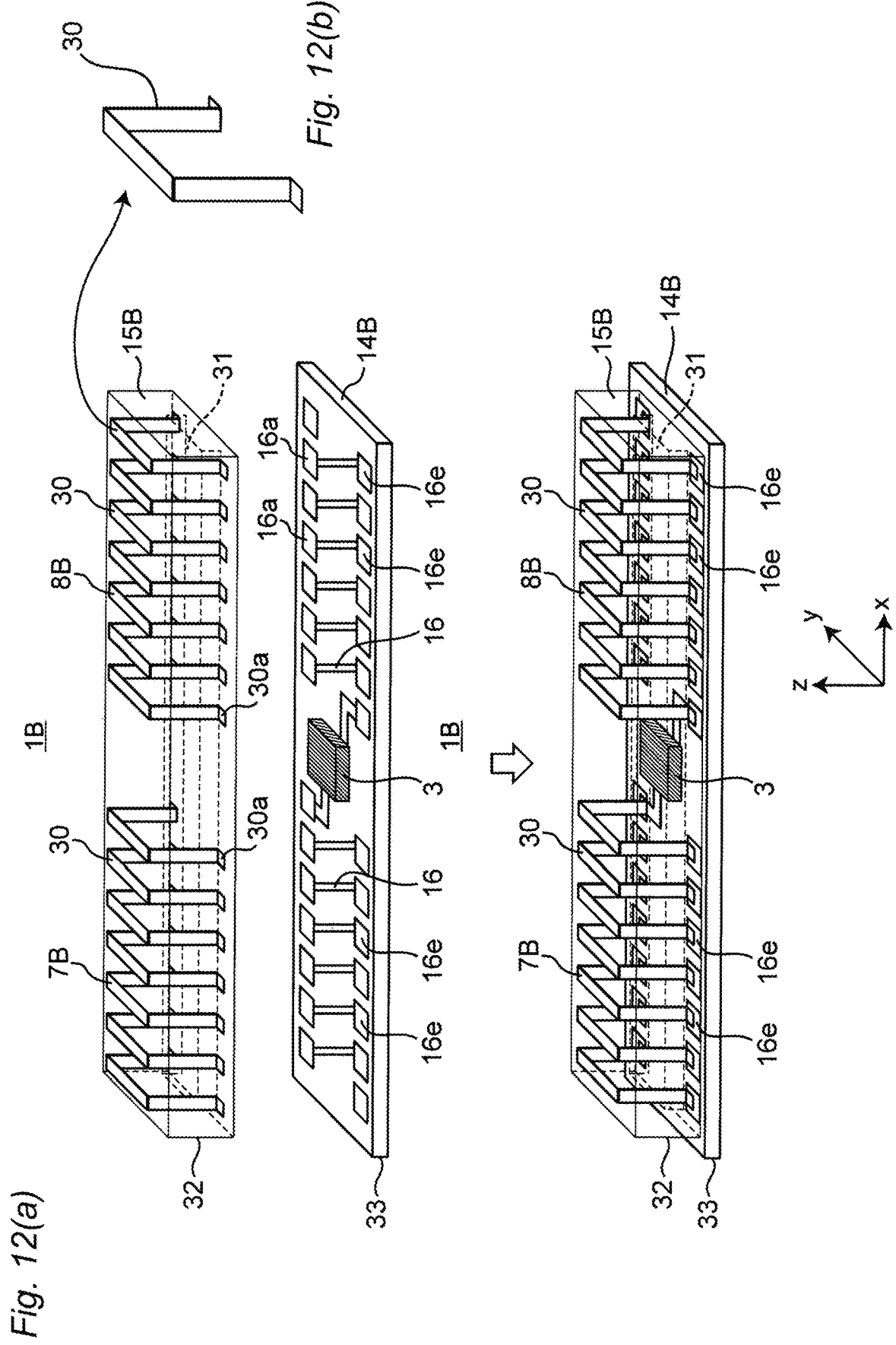

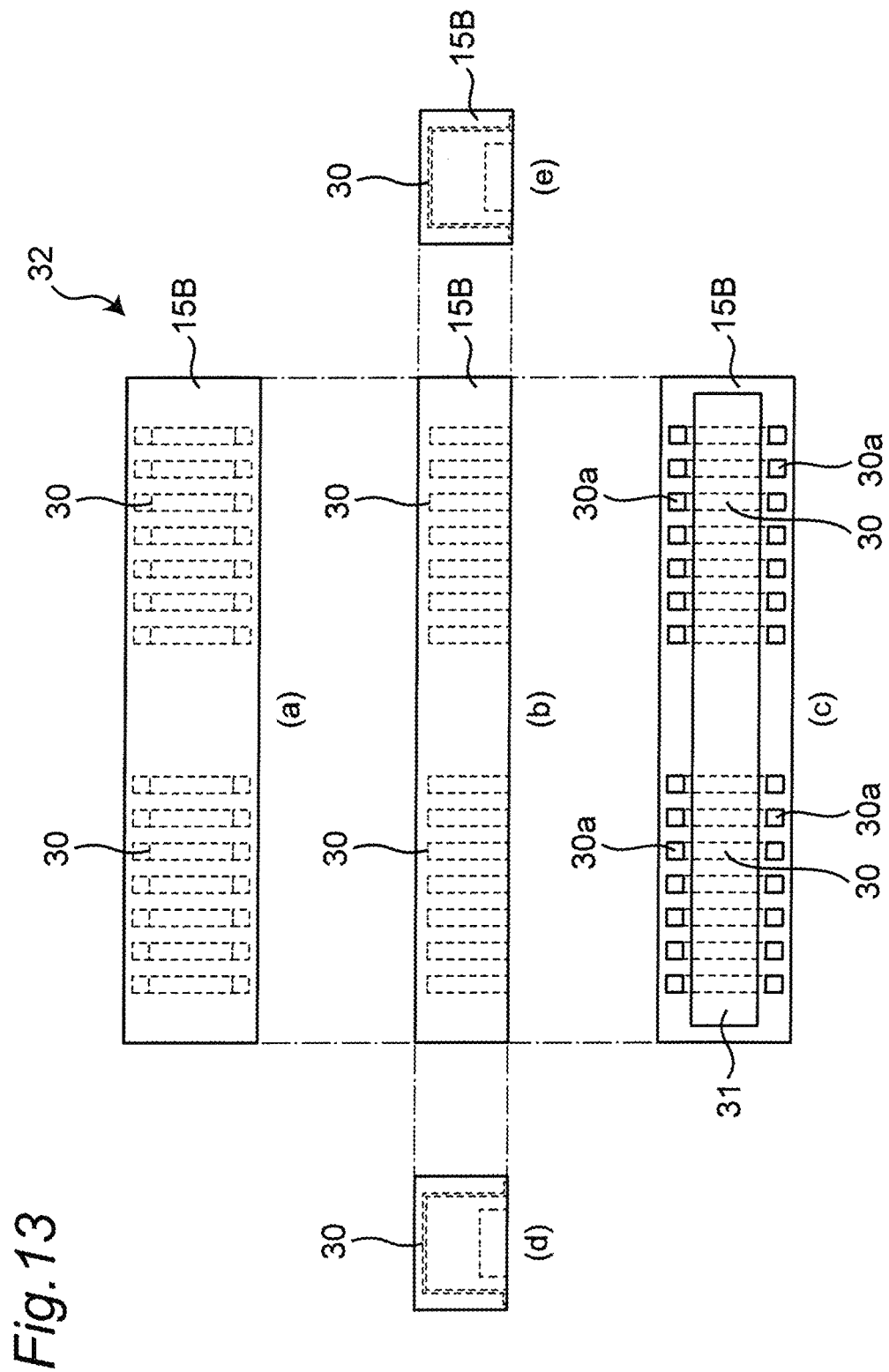

RFID TAG

CROSS REFERENCE TO RELATED APPLICATION

The present application is a continuation of U.S. application Ser. No. 16/256,398, filed Jan. 24, 2019, which is a continuation of PCT/JP2017/042774 filed Nov. 29, 2017, which claims priority to Japanese Patent Application No. 2016-235372, filed Dec. 2, 2016, the entire contents of each of which are incorporated herein by reference.

TECHNICAL FIELD

The present disclosure relates to a radio frequency identification (RFID) tag that is a radio communication tag used to execute information management and the like for an article in a non-contact manner using short-distance radio communication.

BACKGROUND

In a system that executes information management for articles, data communication is performed using an electromagnetic field in a non-contact scheme between a reader apparatus that generates an induced magnetic field and an RFID tag as a radio communication tag attached to an article, such that information relating to each of the articles is thereby managed. The RFID tag used in this system includes an IC chip that stores therein the information and that executes signal processing, and an antenna that transmits and receives a high frequency signal. Because the RFID tag is used for the information management for various types of merchandises, it is important for the RFID tag to facilitate reduction of the weight and the size thereof such that the RFID tag becomes applicable to any one of various types of merchandises. A degree of communication distance is also necessary, such that the RFID tag when attached to an applicable merchandise can reliably execute highly precise information management and data communication. When the communication distance is short for an applied merchandise, the reader apparatus (a reader writer apparatus) has to be brought close to the merchandize for the information communication, and the information management needs to be executed using a special reader apparatus depending on the applied merchandise.

Patent Document 1: Japanese Laid-Open Patent Publication No. 2013-80324.

Patent Document 1 discloses a traditional RFID tag, for example, that includes a configuration that facilitates the reduction of the weight and the size of the RFID tag and that facilitates securing of the communication distance to some extent.

FIG. 14(a) of Patent Document 1 illustrates is a diagram of an RFID tag 100. The RFID tag 100 disclosed in Patent Document 1 has a configuration according to which an RFID tag package 101 is formed by sealing an IC chip 103 and an internal antenna 104 by a sealing material and thereafter an external antenna 102 is disposed on the ID tag package 101. As depicted in FIG. 14(b), in the RFID tag package 101, the IC chip 103 is arranged in the central portion on a substrate 105 made from a resin and has a substantially square shape. Moreover, the internal antenna 104 is formed in a spiral on the outer circumference portion of this IC chip 103 is flatly formed. For the RFID tag 100 of Patent Document 1, the external antenna 102 is formed on a plane that is substantially same as the plane formed by the internal antenna 104 of the RFID tag package 101. In FIG. 14(c), an external antenna 200 is formed in a spring-shaped shape and the internal antenna 104 of the RFID tag package 101 is arranged in parallel to a substantial plane that includes one turn of the spring of this external antenna 200. The RFID tag 100 disclosed in Patent Document 1 and configured as above has a configuration for a magnetic flux from the external antenna 200 to be transmitted to the internal antenna 104 and to be transmitted as a signal to the IC chip 103.

As described above, the RFID tag used in a system such as the one for information management for articles is attached to any one of various types of articles and the RFID tag may therefore be attached to, for example, a soft and deformable article (such as, for example, a garment or linens). When the RFID tag is attached to this type of article and when the article is deformed, the RFID tag may similarly be deformed, such that the shape of the external antenna may be significantly distorted, and the communication property (such as the communication distance) may be significantly varied. This is especially the case when the RFID tag is used for a garment, such that during the washing of the garment, the RFID tag together with the garment continuously receives a large force and the RFID tag may significantly be deformed and may not completely recover. In this case, the communication property of the RFID tag attached to the garment after the washing may be varied and the information management for the article becomes difficult to be highly precisely executed. The reliability of the information management may therefore be degraded.

SUMMARY OF THE INVENTION

Therefore, it is an object of the present disclosure to provide an RFID tag that is a highly reliable radio communication tag for which reduction of the weight and the size thereof is facilitated, that has a desired communication distance, and that is applicable to a deformable article.

Accordingly, an RFID tag is disclosed invention includes an RFIC element that includes a first input and output terminal and a second input and output terminal, a first power feeding coil that has a first end thereof connected to the first input and output terminal of the RFIC element, a second power feeding coil that a first end thereof connected to the second/other end of the first power feeding coil and that has a second end thereof connected to the second input and output terminal of the RFIC element. Moreover, the RFID tag includes a spring-shaped antenna having a first region coupled through a magnetic field with the first power feeding coil and a second region coupled through a magnetic field with the second power feeding coil, and whose first region and the second region are consecutively present from each other through a region therebetween having an inductance component.

According to the exemplary embodiment of the present disclosure, an RFID tag is provided that is a highly reliable radio communication tag having a reduction of the weight and size and that has a desired communication distance, and is also applicable to a deformable article.

BRIEF DESCRIPTION OF DRAWINGS

FIGS. 8(a) and 8(b) are schematic diagrams each of the fact that the power feeding module is arranged inside a spring.

FIG. 9 is a schematic diagram of the state where the power feeding module is arranged and disposed inside the spring.

FIGS. 12(a) and 12(b) are diagrams of the configuration of a power feeding module in an RFID tag of a third exemplary embodiment.

FIG. 13 illustrates diagrams of a resin block of the power feeding module in the RFID tag of the third embodiment.

DETAILED DESCRIPTION

Figure 1:
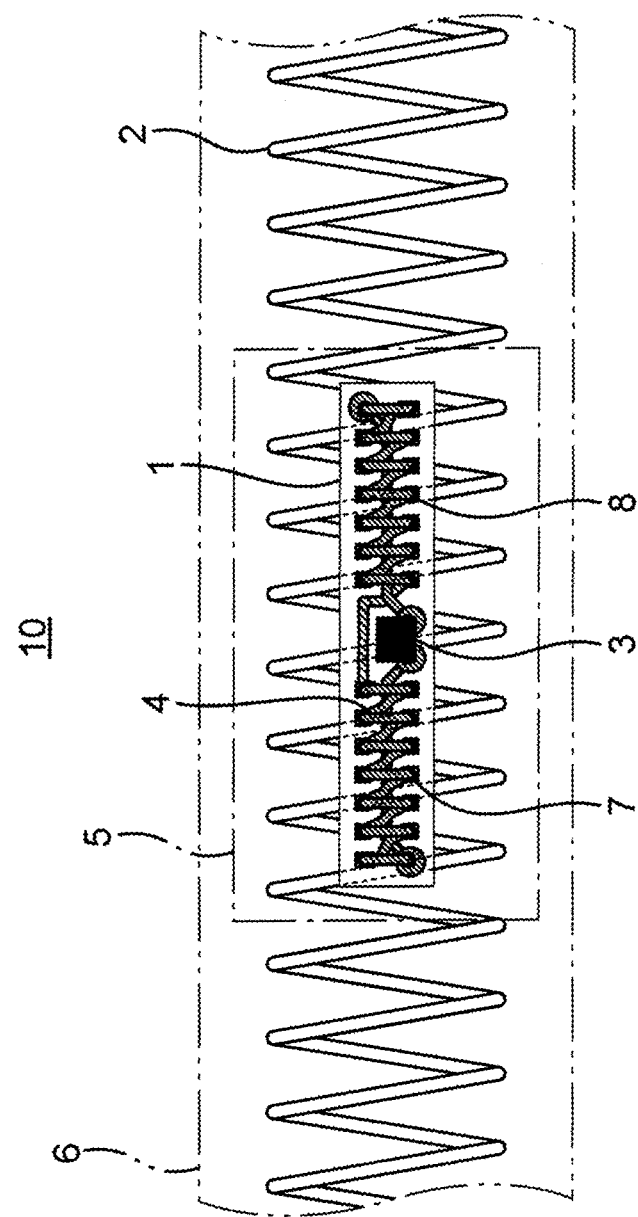
FIG. 1 is a schematic perspective diagram of an RFID tag of a first exemplary embodiment.

An RFID tag of a first exemplary embodiment includes an RFIC element that includes a first input and output terminal and a second input and output terminal, a first power feeding coil that has one end thereof connected to the first input and output terminal of the RFIC element, a second power feeding coil that has one end thereof connected to the other end of the first power feeding coil and that has the other end thereof connected to the second input and output terminal of the RFIC element. Moreover, the RFID tag includes a spring-shaped antenna that includes a first region coupled through a magnetic field with the first power feeding coil and a second region coupled through a magnetic field with the second power feeding coil and that has the first region and the second region consecutively present from each other through a region therebetween that has an inductance component.

The RFID tag of the first exemplary aspect is configured as a highly reliable radio communication tag for which reduction of the weight and the size thereof is facilitated, that has a desired communication distance, and that is applicable to a deformable article.

In an RFID tag of a second exemplary aspect, the winding axes of the first power feeding coil and the second power feeding coil may be on the substantially same axis and may substantially be parallel to the winding axis of the spring-shaped antenna.

The RFID tag of the second exemplary aspect provides a highly reliable and small radio communication tag having an excellent communication property.

In an RFID tag of a third exemplary aspect, the first power feeding coil and the second power feeding coil are arranged on the inner side of the spring-shaped antenna.

The RFID tag of the third exemplary aspect provides for the power feeding module to be protected by the spring-shaped antenna and is established as a highly reliable and small radio communication tag.

In an RFID tag of a fourth exemplary aspect, the RFIC element, the first power feeding coil, and the second power feeding coil may integrally be embedded with each other in a hard-resin block.

The RFID tag of the fourth exemplary aspect provides for the power feeding module integrally formed therein with each other, and the RFIC element itself is therefore protected and the connection points between the RFIC element and the power feeding coils, and the like are reliably protected to establish a highly reliable and small radio communication tag.

In an RFID tag of a fifth exemplary aspect, a hard-resin block having the RFIC element, the first power feeding coil, and the second power feeding coil embedded therein, and at least a portion of the spring-shaped antenna may be integrated with each other by a resin material having flexibility.

The RFID tag of the fifth exemplary aspect provides for the hard-resin block having the RFIC element, the first power feeding coil, and the second power feeding coil embedded therein and at least the portion of the spring-shaped antenna, integrated therein with each other by the resin material having flexibility, and a bendable and flexible configuration is established as an RFID tag 10, and the RFID tag can be attached to any one of various merchandises (including deformable merchandises).

In an RFID tag of a sixth exemplary aspect, the hard-resin block having the RFIC element, the first power feeding coil, and the second power feeding coil embedded therein, and the first region and the second region of the spring-shaped antenna may be integrated with each other by a resin material having flexibility.

The RFID tag of the sixth exemplary aspect has the hard-resin block having the RFIC element, the first power feeding coil, and the second power feeding coil embedded therein, and at least the first region and the second region of the spring-shaped antenna integrated with each other therein by a resin material having flexibility and therefore, in the case where the RFID tag is used for, for example, a bendable article such as a garment, even when the RFID tag continuously receives a large force together with the garment during washing of the garment, the RFID tag completely recovers and the communication property of the RFID tag is not varied to be able to highly precisely execute the information management for the article.

In an RFID tag of a seventh exemplary aspect, in a closed circuit having the RFIC element, the first power feeding coil, and the second power feeding coil of the first aspect connected therein to each other through connection conductors, the RFIC element may be arranged between the first power feeding coil and the second power feeding coil whose winding axes are on the substantially same axis, the first input and output terminal of the RFIC element may be connected to a distal end of the first power feeding coil through the first connection conductor, the second input and output terminal of the RFIC element may be connected to a distal end of the second power feeding coil through the second connection conductor, and proximal ends of the first power feeding coil and the second power feeding coil may be connected to each other through a third connection conductor.

For the RFID tag of the seventh exemplary aspect, when the RFID tag is used in, for example, a UHF band, the point most distant from the RFIC element to be the power feeding element is the maximal current point and the configuration having the power feeding coils disposed in the vicinity of the maximal current point is established. A configuration is therefore established with which highly efficient power feeding operation can be executed for the spring-shaped antenna and an excellent communication property is presented.

Exemplary embodiments of the RFID tag to be the radio communication tag according to the present disclosure will be described below with reference to the accompanying drawings. It should be appreciated that members having the substantially same functions and substantially same configurations in the accompanying drawings are given the same reference numerals and may not again be described herein. The accompanying drawings schematically depict mainly the components of each thereof for facilitation of understanding.

Any of the exemplary embodiments described below presents a specific example of the present invention and the present invention is not limited to the configuration thereof. The numerical values, shapes, configurations, steps, order of steps, and the like each specifically presented in the embodiments below each present an example and do not each limit the present invention. Of the components in the embodiments described below, the components not described in the appended independent claim that describes the most generic concept will be described as optional components. In all the embodiments, the same will be applied to the configurations of modification examples thereof, and the configurations described in the modification examples may be combined with each other.

First Exemplary Embodiment

Figure 2:
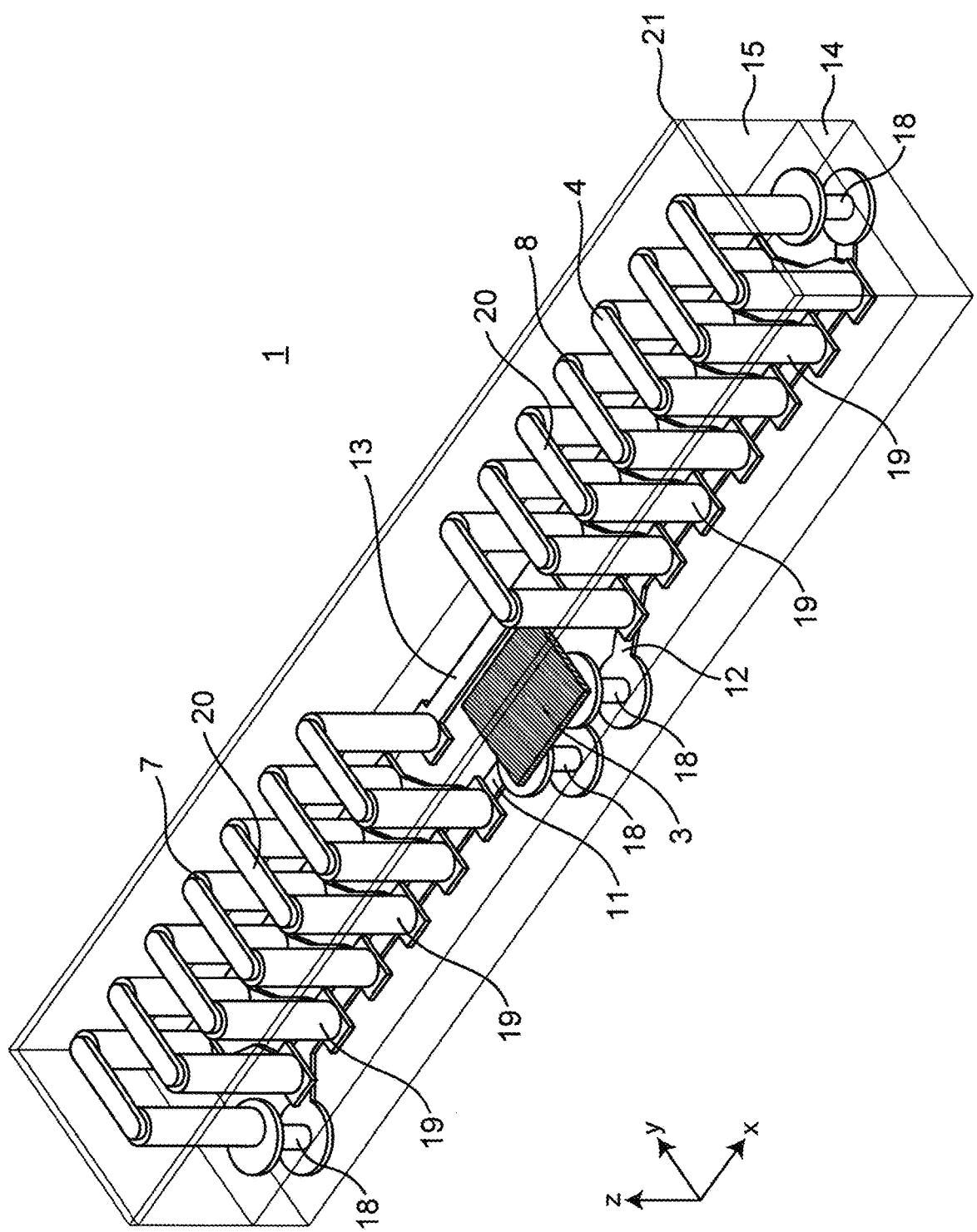
FIG. 2 is a perspective diagram of a power feeding module embedded inside the RFID tag of the first exemplary embodiment.

FIG. 1 is a schematic perspective diagram of an RFID tag 10 of the first exemplary embodiment. FIG. 2 is a perspective diagram of a power feeding module 1 embedded inside the RFID tag 10 of the first exemplary embodiment. To enable easy understanding of the configuration of the first embodiment, in FIG. 1 and FIG. 2, an RFIC element 3, a circuit pattern, and the like disposed inside the power feeding module 1 are depicted. In FIG. 2, for convenience, an x-axis, a y-axis, and a z-axis are depicted that intersect each other at right angles, and the longitudinal direction (an x-direction), the width direction (a y-direction), and the height direction (a z-direction) of the RFID tag 10 of the first embodiment may be descried using the x-axis, the y-axis, and the z-axis.

As depicted in FIG. 1, in the RFID tag 10, the power feeding module 1 is arranged (i.e., disposed) inside a spring 2. The spring 2 can be formed using an elastically deformable spring material and acts as a spring-shaped antenna. In the configuration of the first embodiment, the power feeding module 1 having an elongated and substantially cuboid shape is arranged in the substantial center of the spring 2 that is the spring-shaped antenna. The power feeding module 1 including the RFIC element 3 that is an IC chip, power feeding coils (7 and 8), and the like is formed as a block using a hard resin material such as a thermosetting resin represented by an epoxy resin material. The power feeding module 1 to be the hard-resin block is arranged inside the spring 2 and is fixed to the spring 2 by a resin material having flexibility.

As indicated by a dashed-dotted line in FIG. 1, the power feeding module 1 and a portion of the spring 2 are formed in a block using, for example, a resin material having flexibility such as, for example, a silicon rubber-based resin material, and a first power feeding block 5 is thereby formed. In the RFID tag 10 of the first embodiment, as indicated by a dashed-two dotted line in FIG. 1, a second power feeding block 6 is formed that covers the first power feeding block 5 and that also covers all of the rest of the spring 2. Similar to the first power feeding block 5, the second power feeding block 6 is formed as a block using a resin material having flexibility such as, for example, a silicon rubber-based resin material.

Because the RFID tag 10 includes the elastically deformable spring 2 and is covered by the resin material having flexibility as above, the configuration is established that has softness as the overall RFID tag 10 and the RFID tag 10 has the configuration with which, even in the case where the RFID tag 10 receives an external force and is deformed thereby, when the external force is removed, the RFID tag 10 immediately recovers into its original shape.

For the configuration of the first exemplary embodiment, the configuration includes the first power feeding block 5 that covers the power feeding module 1 and the portion of the spring 2 that is further covered by the second power feeding block 6 while, as described later, the spring 2 including the regions that face the plural power feeding coils (7 and 8) in the power feeding module 1 and that are coupled each through a magnetic field therewith only has to be present in the first power feeding block 5, and molding of the overall RFID tag 10 using a resin is not an essential configuration.

Figure 3:
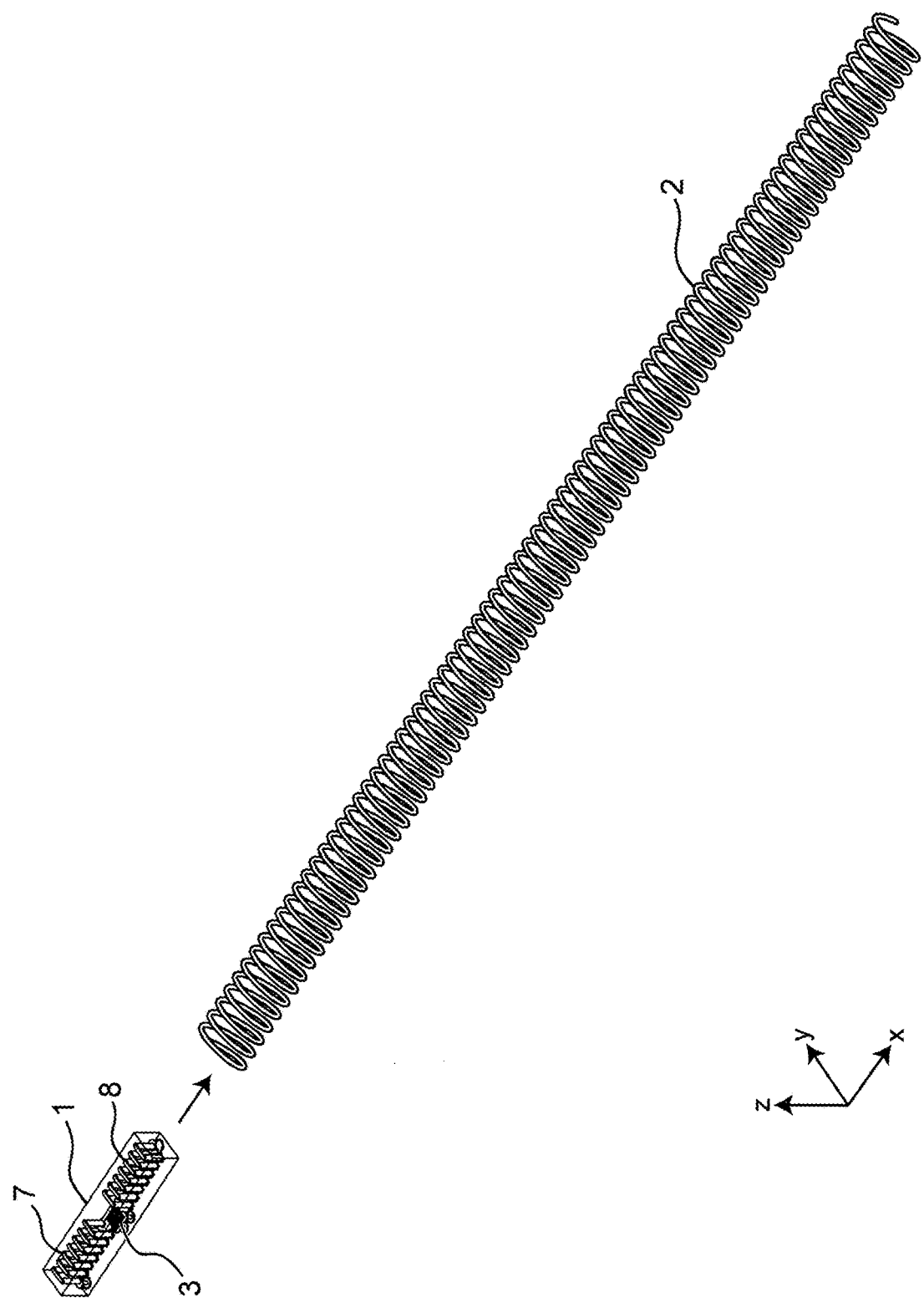
FIG. 3 is a diagram for explaining a configuration of the RFID tag.

FIG. 3 is a diagram for explaining the overview that the power feeding module 1 having the cuboid shape elongated in the x-direction is inserted into the spring 2 that is the spring-shaped antenna having a shape elongated in the x-direction and the RFID tag 10 of the first embodiment is thereby formed. In the first embodiment, the longitudinal direction of the spring 2 (the x-direction) and the longitudinal direction of the power feeding module 1 (the x-direction) are configured to match with each other.

Figure 4:
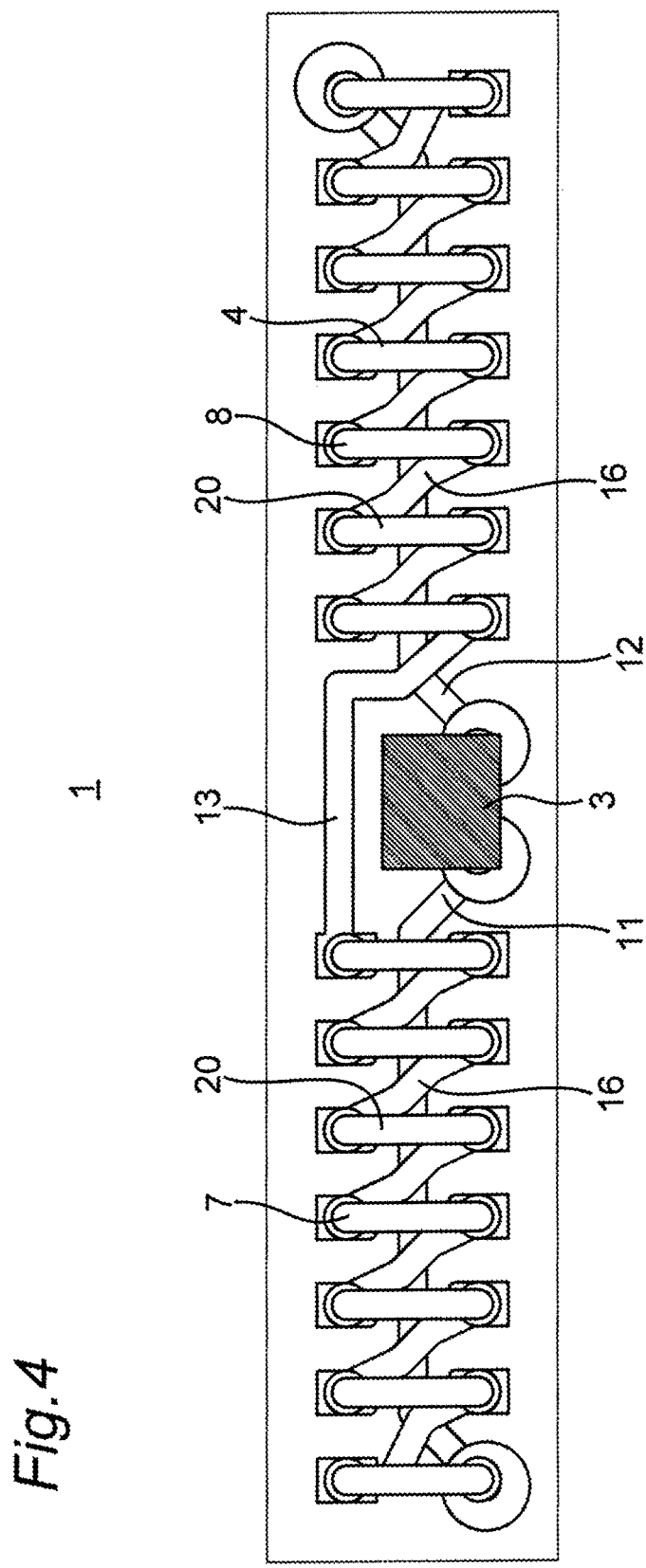
FIG. 4 is a diagram of an internal configuration of the power feeding module.
Figure 5:
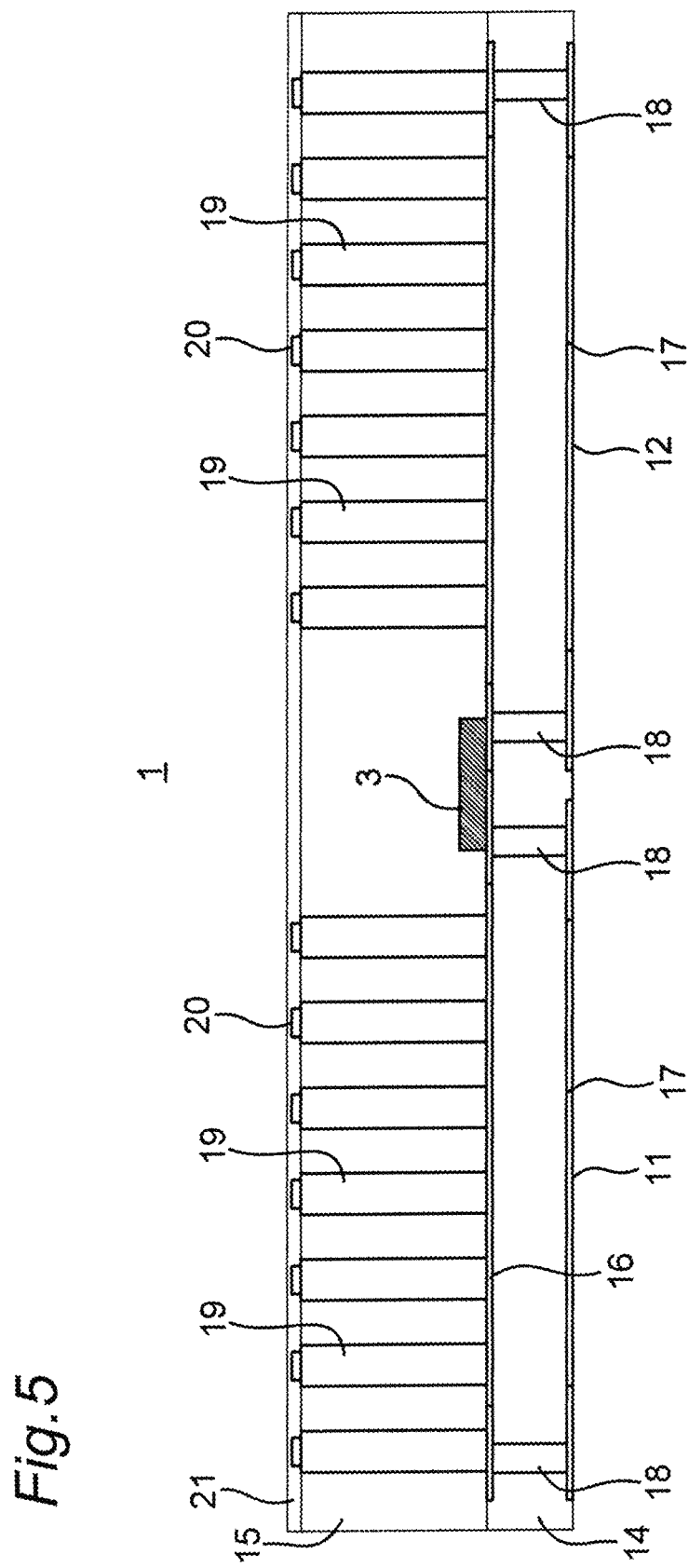
FIG. 5 is a front diagram of the power feeding module seen in a width direction thereof.
Figure 6:
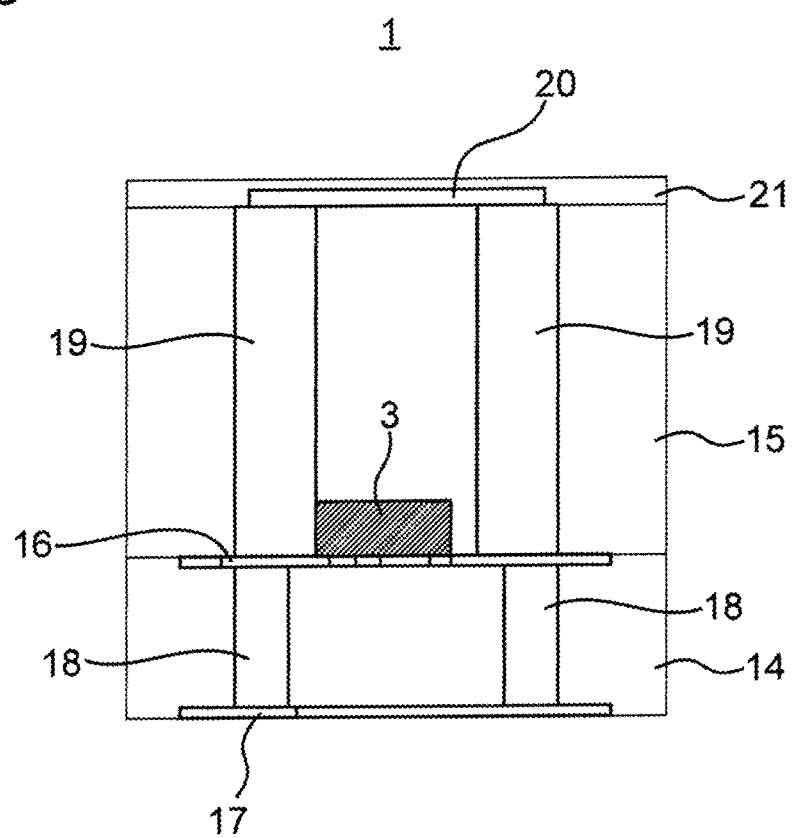
FIG. 6 is a side diagram of the power feeding module seen in a longitudinal direction thereof.

FIG. 4 to FIGS. 7(a) to 7(c) are diagrams for explaining the internal configuration of the power feeding module 1 in the first embodiment. In FIG. 4 to FIG. 6, to facilitate the understanding, only the internal configuration is depicted by seeing the internal configuration through the resin material of the power feeding module 1. FIG. 4 is a diagram of the internal configuration of the power feeding module 1 in a planar view of the power feeding module 1. FIG. 5 is a front diagram of the power feeding module 1 seen in the width direction thereof (the y-direction). FIG. 6 is a side diagram of the power feeding module 1 seen in the longitudinal direction thereof (the x-direction).

As shown in FIG. 4, inside the power feeding module 1, the RFIC element 3 that is an IC chip, the first power feeding coil 7, the second power feeding coil 8, plural connection conductors (11, 12, and 13) that electrically connect these components, and the like are disposed.

As depicted in the front diagram of FIG. 5, in the power feeding module 1, a resin block 15 is formed on a printed circuit board 14, a protective layer (e.g., a coverlay) 21 is formed on the resin block 15, and the power feeding module 1 therefore has a three-layer structure. Conductor patterns (16 and 17) are formed on the faces (a first principal surface and a second principal surface) on and beneath the printed circuit board 14 to be the lowermost layer. A conductor pattern (20) is formed also on the top face of the resin block 15. These conductor patterns (16, 17, and 20) are each formed by a plating film formed by plating using, for example, Cu and are each formed by forming a conductor film such as a Cu film and executing patterning using a photo resist, etching, and the like. The conductor patterns can also be formed by screen-printing a conductive paste, for example.

The conductor patterns are electrically connected to each other by via hole conductors 18, metal pins 19, and the connection conductors (11, 12, and 13) described later to establish a desired wire pattern 4. The via hole conductors 18 formed in the printed circuit board 14 electrically connect the upper face side conducting wire pattern (a first principal surface side conductor pattern: a second conductor pattern) 16 and the lower face side conducting wire pattern (a second principal surface side conductor pattern: a third conductor pattern) 17 to each other. The metal pins 19 disposed to penetrate the resin block 15 in the up-and-down direction electrically connect the upper face side conducting wire pattern (the second conductor pattern) 16 and a top face side conductor pattern (a first conductor pattern) 20 formed on the top face of the resin block 15 to each other. The top face side conductor pattern (the first conductor pattern) 20 of the resin block 15 is protected by the protective layer (i.e., the coverlay) 21.

According to the exemplary embodiment the metal pin 19 is a columnar metal lump and is, for example, a columnar Cu pin. In the first embodiment, a Cu wire having a circular cross-section is cut at a predetermined length as a unit to be used. The cross-sectional shape of the metal pin 19 does not however need to be a circular shape as should be appreciated to one skilled in the art.

Figure 7A:
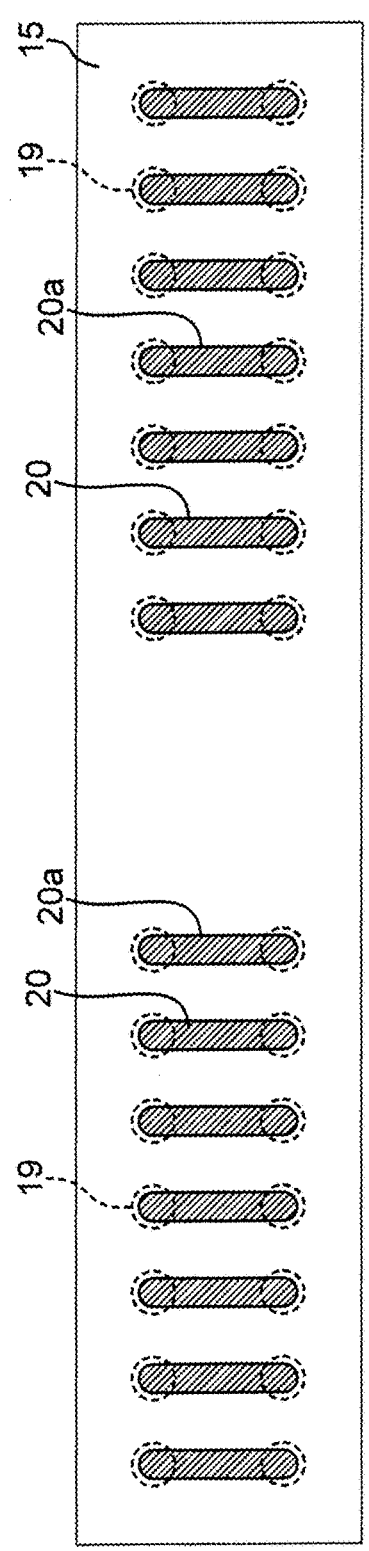
FIGS. 7(a) to 7(c) are diagrams of three conductor patterns of the power feeding module in the first exemplary embodiment.
Figure 7B:
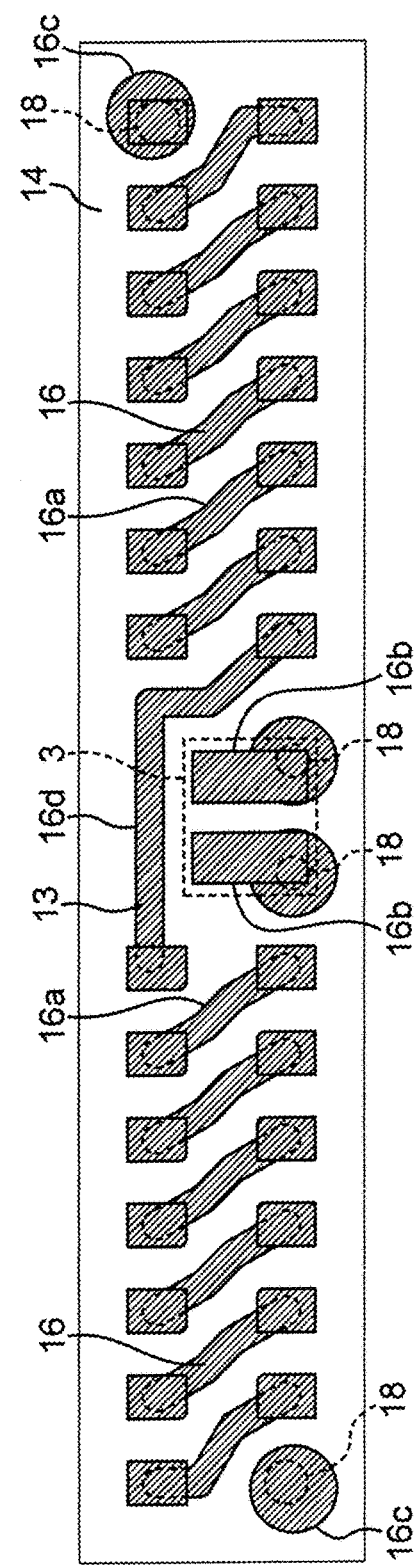
Figure 7C:
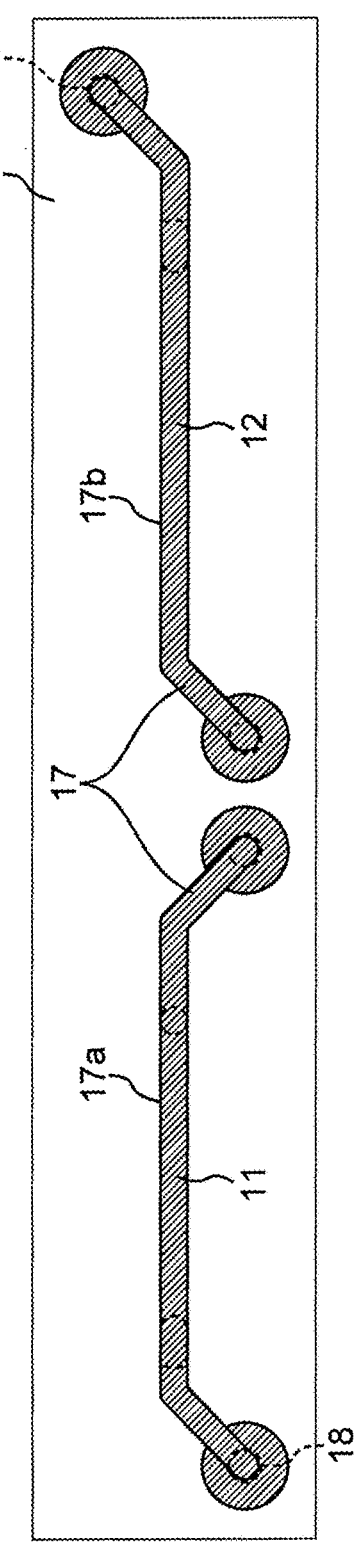

The three conductor patterns (16, 17, and 20) are connected to the via hole conductors 18 and the metal pins 19 as above and the wire pattern 4 is formed for the RFIC element 3 to be the IC chip of the power feeding module 1 in the first embodiment. FIGS. 7(*a*) to 7(*c*) are diagrams of the three conductor patterns (16, 17, and 20) of the power feeding module 1 in the first embodiment.

Specifically, FIG. 7(*a*) is a plan diagram of the top face side conductor pattern (the first conductor pattern) 20 that is formed on the top face of the resin block 15. FIG. 7(*b*) is a plan diagram of the upper face side conducting wire pattern (the second conductor pattern) 16 of the printed circuit board 14. FIG. 7(*c*) is a back side diagram of the lower face side conducting wire pattern (the third conductor pattern) 17 of the printed circuit board 14.

The first conductor pattern 20 shown in FIG. 7(*a*) is electrically connected to a top face side end portion of the metal pin 19 that penetrates the resin block 15, and thereby forms a desired wire pattern 20*a*. The second conductor pattern 16 shown in FIG. 7(*b*) includes a wire pattern 16*a* that is electrically connected to a bottom face side end portion of the metal pin 19 that penetrates the resin block 15. The second conductor pattern 16 includes a wire pattern 16*b* that connects the two input and output terminals of the RFIC element 3 to be the IC chip to the third conductor pattern 17 formed on the lower face side of the printed circuit board 14 through the via hole conductors 18, a wire pattern 16*c* to connect the third conductor pattern 17 to the metal pins 19 through the via hole conductors 18, and a wire pattern 16*d* to be the connection conductor (i.e., the third connection conductor 13) that electrically connects the first power feeding coil 7 and the second power feeding coil 8 to each other.

The third conductor pattern 17 shown in FIG. 7© includes wire patterns (17*a* and 17*b*) on the second principal surface to be the face opposite to the first principal surface of the printed circuit board 14 having the RFIC element 3 mounted thereon. The third conductor pattern 17 includes wire patterns (17*a* and 17*b*) that extends from the input and output terminals of the RFIC element 3 mounted in the substantial center of the elongated printed circuit board 14 through the via hole conductors 18 formed immediately there beneath to the positions of the distal ends present in the vicinities of the end portions on both sides of the printed circuit board 14 in the longitudinal direction. In FIG. 7(*c*), the wire pattern 17*a* on the left side acts as a first connection conductor 11 and the wire pattern 17*b* on the right side acts as a second connection conductor 12. Moreover, the first connection conductor 11 and the second connection conductor 12 form current paths that extend substantially linearly in the right-and-left direction (the x-direction).

The RFIC element 3 to be an IC chip is disposed inside the power feeding module 1 as above, and the wire pattern 4 is formed for the first power feeding coil 7 and the second power feeding coil 8 formed as above to be connected to the RFIC element 3 through the three connection conductors (11, 12, and 13).

FIGS. 8(*a*) and 8(*b*) are schematic diagrams each of the fact that the RFIC element 3, the first power feeding coil 7, and the second power feeding coil 8 present inside the power feeding module 1 formed as above are arranged inside the spring 2. Specifically, as shown in FIG. 8(*a*), the first power feeding coil 7 and the second power feeding coil 8 are arranged and disposed on both sides of the RFIC element 3 to be the IC chip, and the coil central axes of the first power feeding coil 7 and the second power feeding coil 8 are formed to be substantially same. The winding axes of the first power feeding coil 7 and the second power feeding coil 8 are disposed on the substantially same axis.

The first connection conductor 11 connected to the first input and output terminal to be the one input and output terminal of the RFIC element 3 and derived therefrom is disposed to extend passing on the lower side of the first power feeding coil 7 and is connected to the distal end distal from the RFIC element 3 of the first power feeding coil 7. Similarly, the second connection conductor 12 connected to the second input and output terminal to be the other input and output terminal of the RFIC element 3 and derived therefrom is disposed to extend passing on the lower side of the second power feeding coil 8 and is connected to the distal end distal from the RFIC element 3 of the second power feeding coil 8. The proximal end of the first power feeding coil 7 is connected to the proximal end of the second power feeding coil 8 through the third connection conductor 13. The third connection conductor 13 is a line path that is shorter than each of the first connection conductor 11 and the second connection conductor 12, and is a short linear current path that can substantially bypass the RFIC element 3 to be the IC chip.

As to a specific configuration of the power feeding module 1 in the first embodiment, the shape thereof is a substantial cuboid shape having sides each of about 1.0 mm and a length of about 5.0 to about 6.0 mm, for example. The first power feeding coil 7 and the second power feeding coil 8 have the substantially same configuration and the substantially same shape, and have the equal number of turns.

The power feeding module 1 configured as above is arranged and disposed inside the spring 2 to form the RFID tag 10. The spring 2 is the spring-shaped antenna that functions as an emission body of the radio wave from the RFID tag 10, and functions as a what-is-called antenna booster. The spring 2 in the first embodiment is made from a metal and is formed by, for example, a stainless spring material.

Because the first power feeding coil 7 and the second power feeding coil 8 of the power feeding module 1 are arranged and disposed inside the spring 2 as shown FIG. 8(*b*), for example, the first power feeding coil 7 and the second power feeding coil 8 are in the state where the first power feeding coil 7 and the second power feeding coil 8 are coupled through a magnetic field with the coil of the spring 2. Thus, as shown in FIG. 8(*b*), for example, the first region denoted by a reference letter α in the spring 2 is the region that is coupled mainly through a magnetic field with the first power feeding coil 7 of the power feeding module 1, and the second region denoted by a reference letter β in the spring 2 is the region that is coupled mainly through a magnetic field with the second power feeding coil 8 thereof. The coil of the spring 2 therefore includes the first region α coupled through a magnetic field with the first power feeding coil 7 and the second region β coupled through a magnetic field with the second power feeding coil 8. Moreover, the first region α and the second region β are configured to be consecutively present through a region therebetween that has an inductance component. As disclosed above, in the configuration of the first exemplary embodiment, the first power feeding coil 7 and the second power feeding coil 8 in the power feeding module 1 are the elements that are coupled each through a magnetic field with the spring 2 to be the spring-shaped antenna and concurrently act as elements for a matching circuit of the RFIC element 3 in the power feeding module 1, to be the elements that exert these functions.

FIG. 9 illustrates an overview of the configuration of the RFID tag 10 as shown in FIG. 8(*b*), and is a schematic diagram of the state where the power feeding module 1 including the RFIC element 3, the first power feeding coil 7, and the second power feeding coil 8 is arranged and disposed inside the spring 2. More particularly, FIG. 9 illustrates the fact that the RFIC element 3 in the RFID tag 10 is a power feeding element, the first power feeding coil 7 has an inductance value Lc1, and the second power feeding coil 8 has an inductance value Lc2.

Though not specifically shown in FIGS. 8(*a*) and (*b*) and FIG. 9, the power feeding module 1 including the RFIC element 3, the first power feeding coil 7, and the second power feeding coil 8 is integrally embedded in the block of a hard resin such as a thermosetting resin represented by an epoxy resin material and is formed as a module, as above. Because the power feeding module 1 is formed as a module by the block of a hard resin as above, the RFIC element 3 itself is protected, and the connection points between the RFIC element 3 and the power feeding coils (7 and 8), the wire patterns, and the like are reliably protected.

In the configuration of the first exemplary embodiment, the power feeding module 1 is integrally formed to be the block with the spring 2 by the resin material having flexibility such as, for example, a silicon rubber-based resin material to form the RFID tag 10. For the RFID tag 10, a bendable and soft configuration is therefore established and the RFID tag can be attached to any one of various merchandises (including deformable merchandises).

Figure 10A:
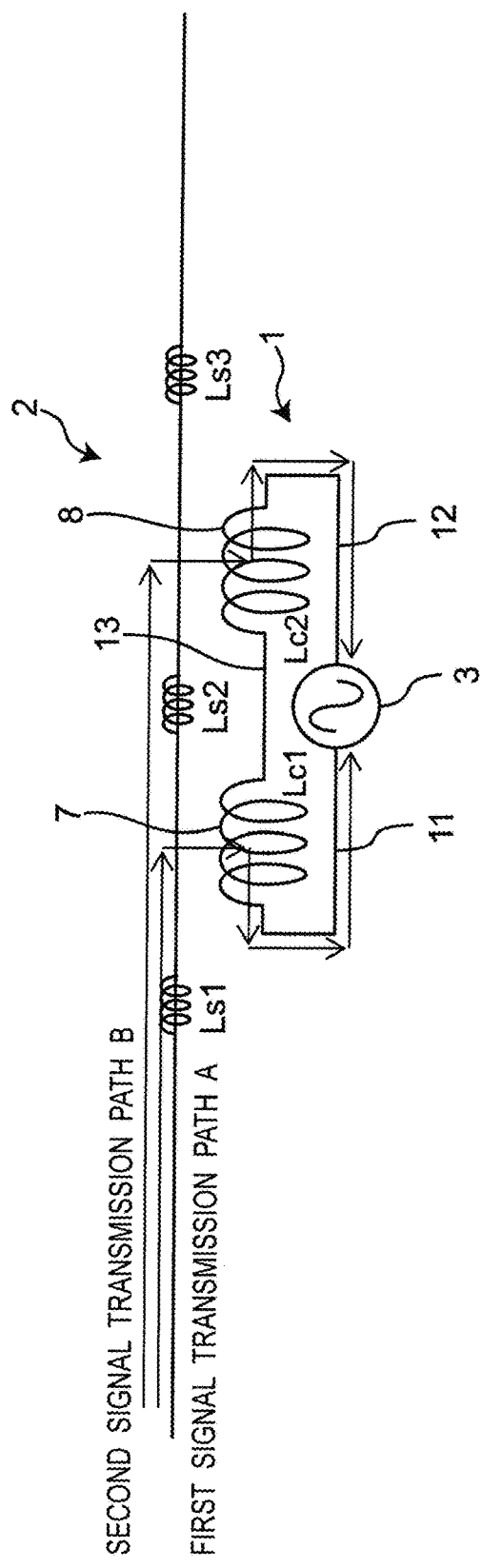
FIGS. 10(a) and 10(b) are a diagram of an example of a signal transmission path in the RFID tag of the first exemplary embodiment and a graph of a frequency property thereof.
Figure 10B:
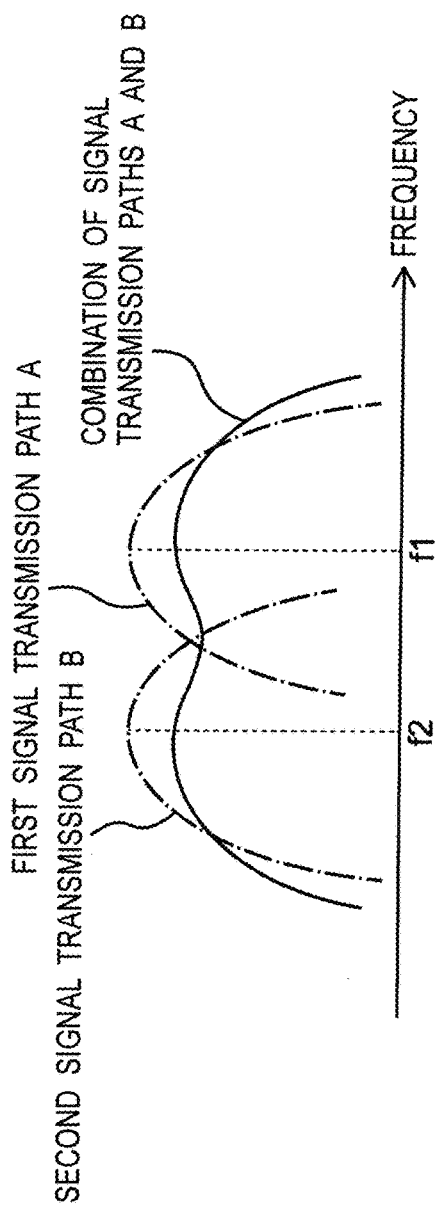

FIG. 10(*a*) is a schematic diagram of an example of a signal transmission path between the power feeding module 1 and the spring 2 in the RFID tag 10. When a high frequency signal is received by the spring 2, the signal is transmitted to each of the first power feeding coil 7 and the second power feeding coil 8 coupled through a magnetic field therewith. As shown in FIG. 10(*a*), when the signal flows, in a first signal transmission path A, a current flows through an inductor Ls1 of the spring 2 and a current flows through the first power feeding coil (the inductor Lc1) 7 of the power feeding module 1 coupled through a magnetic field with the inductor Ls1. In a second signal transmission path B, a current flows through the inductors Ls1 and Ls2 of the spring 2 and a current flows through the second power feeding coil (the inductor Lc2) 8 of the power feeding module 1 coupled through a magnetic field with the inductor Ls2.

FIG. 10(*b*) illustrates the frequency property of the signal transmission paths depicted in FIG. 10(*a*). Specifically, in FIG. 10(*b*), the property acquired when the signal flows through the first signal transmission path A and the property acquired when the signal flows through the second signal transmission path B are each indicated by a dashed-dotted line. As depicted in the frequency property diagram in FIG. 10(*b*), a resonance frequency f1 observed when the signal flows through the first signal transmission path A (a first resonance mode) and a resonance frequency f2 observed when the signal flows through the second signal transmission path B (a second resonance mode) differ from each other. This is because the electric length of the first signal transmission path A and the electric length of the second signal transmission path B differ from each other. Because the first resonance mode and the second resonance mode having the different resonance frequencies (f1 and f2) as above are configured to combine with each other in the first embodiment, the frequency property is set to cope with a wide band and the RFID tag 10 whose detection range is wide is constructed (see the waveform in a solid line shown in FIG. 10(*b*)).

As described above, the RFID tag of the first embodiment has the frequency property whose band is widened and is established as a highly versatile radio communication tag. For the RFID system using the RFID tag 10, examples of the merchandise to which the RFID tag 10 is attached include, for example, a garment and linens. The RFID tag 10 attached to this type of merchandise may receive a large force during washing or the like to be deformed while, because the RFID tag 10 of the first embodiment is flexible and has an elastic force, the power feeding module 1 itself does not directly receive any influence and reliable transmission and reliable reception of signals by the power feeding module 1 are enabled.

Moreover, it is noted that the RFID system has the configuration according to which the information relating to the RFID tag 10 attached to the merchandise is read by the reader apparatus that is the power feeding circuit and the merchandise management is thereby executed. Examples of the RFID system used for the merchandise management include, for example, a UHF-band RFID system that uses a 900-MHz band.

In the RFID tag 10 of the first exemplary embodiment, the RFIC element 3 to be the IC chip is arranged and disposed in the substantial center of the power feeding module 1 and the first connection conductor 11 and the second connection conductor 12 connected to the RFIC element 3 extend from the RFIC element 3 on both sides thereof to respectively be connected to the distal end sides of the first power feeding coil 7 and the second power feeding coil 8 respectively through the first connection conductor 11 and the second connection conductor 12. The proximal ends facing each other, of the first power feeding coil 7 and the second power feeding coil 8 are connected to each other through the third connection conductor 13. The first power feeding coil 7 and the second power feeding coil 8 are therefore configured to be connected to the positions that are most distant from the RFIC element 3 as the electric lengths in a closed circuit formed by the first input and output terminal of the RFIC element 3 to the first connection conductor 11 to the first power feeding coil 7 to the third connection conductor 13 to the second power feeding coil 8 to the second connection conductor 12 to the second input and output terminal of the RFIC element 3. This is because the point most distant from the RFIC element 3 to be the power feeding element becomes the maximal current point in the closed circuit of the above configuration that uses the UHF band, and the configuration is therefore established that can execute a highly efficient power feeding operation for the spring 2 on the outer side by disposing the power feeding coils in the vicinity of the maximal current point.

For example, according to an experiment conducted by the inventor, the power feeding module 1 of 4 W alone had a communication area diameter of about 1 cm while the communication area diameter was increased to a 100-fold value of its original value by disposing the spring 2 on the outer side of the power feeding module 1. The RFID tag 10 had the configuration for the spring to be disposed on the outer side of the power feeding module 1 as a boost antenna.

As described above, the RFID tag of the first embodiment is a radio communication tag that uses the elastically deformable spring 2 as an emission body thereof and the configuration thereof is established that can significantly enhance the communication capacity by disposing the spring that is coupled through a magnetic field with the power feeding module 1 in the vicinity of the power feeding module 1.

The RFID tag 10 of the first embodiment has the configuration according to which the two power feeding coils of the first power feeding coil 7 and the second power feeding coil 8 are disposed in the power feeding module 1 to be the power feeding circuit to supply the high frequency signal to the spring 2 or to receive the high frequency signal from the spring 2, and widening of the band is thereby facilitated. Thus, even when the spring 2 disposed on the outer side of the power feeding module 1 is stretched, compressed, or bent, any variation of the communication property (the reading property) of the radio communication tag itself of the RFID tag 10 can be suppressed to its minimum and a highly reliable radio communication tag is established.

In the RFID tag 10 of the first embodiment, the power feeding module 1 to be the power feeding circuit is not directly connected to the spring 2 and is coupled thereto through a magnetic field. The RFID tag 10 therefore has the configuration for any external force applied to the spring 2 not to be transferred as it is to the power feeding module 1. The configuration is therefore established according to which the external force applied to the RFID tag 10 is not transferred as it is to the RFIC element 3 itself, and the connection portions between the RFIC element 3 and the wire patterns that are relatively weak against an impact force and the like, and the RFIC element 3 itself, and the connection portions between the RFIC element 3 and the wire patterns are reliably protected.

The two coils of the first power feeding coil 7 and the second power feeding coil 8 in the power feeding module 1 function as the elements for the coupling through a magnetic field with the spring 2 and each also act as the function as the element for the matching circuit of the RFIC element.

The first power feeding coil 7 and the second power feeding coil 8 in the power feeding module 1 have the substantially same configuration and the winding axes thereof are in the same direction. The winding axes of the first power feeding coil 7 and the second power feeding coil 8 are in the same direction as that of the winding axis of the spring 2. The RFID tag 10 of the first embodiment configured as described above can highly efficiently execute the power feeding and downsizing can be facilitated for the overall radio communication tag.

In the RFID tag 10 of the first embodiment, the power feeding module 1 including the RFIC element 3 and the two power feeding coils (7 and 8) is integrally embedded in the block of a hard resin such as a thermosetting resin and is formed as a module. Because the power feeding module 1 is formed as a module by the block of the hard resin to be integrated as above, the RFIC element 3 itself, the connection points between the RFIC element 3 and the power feeding coils (7 and 8), the wire patterns, and the like are reliably protected and a device with high reliability is established.

Second Exemplary Embodiment

An RFID tag of the second exemplary embodiment according to the present disclosure will be described with reference to accompanying FIG. 11. The RFID tag of the second embodiment differs from the RFID tag 10 of the above first embodiment in the configuration of the power feeding coils in the power feeding module. In the RFID tag of the second embodiment, the configuration except the power feeding coils is same as that of the RFID tag 10 of the first embodiment. In the description for the second embodiment, elements having the substantially same functions and the substantially same configurations as those of the first embodiment are given the same reference numerals. The basic operation in the second embodiment is same as the basic operation in the first embodiment, and the points different from the first embodiment will therefore be mainly described in the second embodiment.

Figure 11:
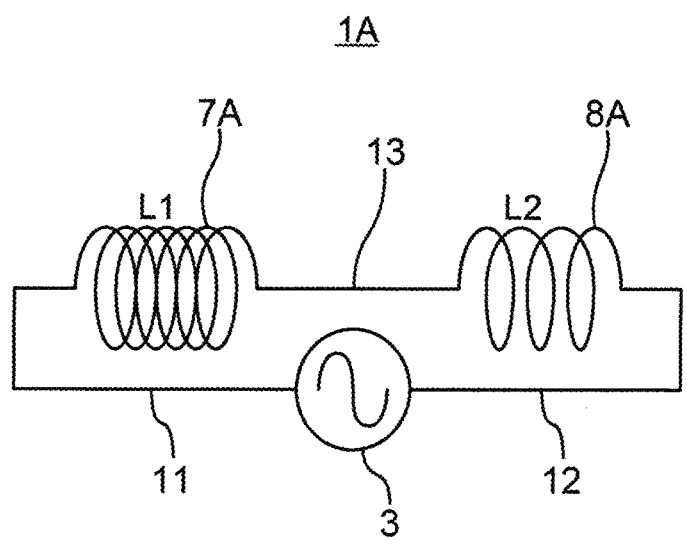
FIG. 11 is a schematic diagram of the circuit configuration of a power feeding module in an RFID tag of a second exemplary embodiment.
Figure 14A:
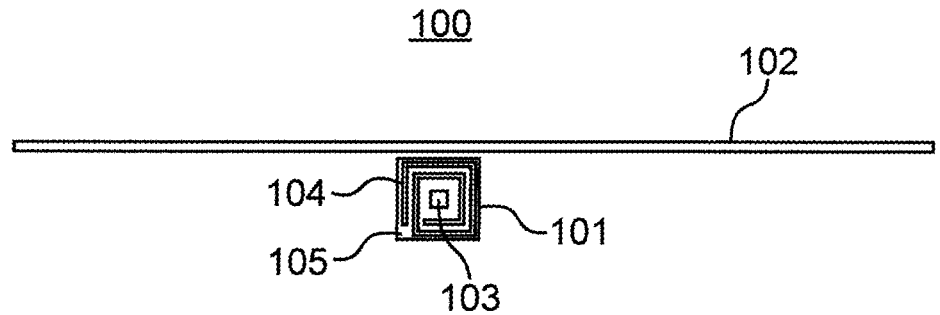
FIGS. 14(a) to 14(c) are diagrams of a traditional RFID tag.
Figure 14B:
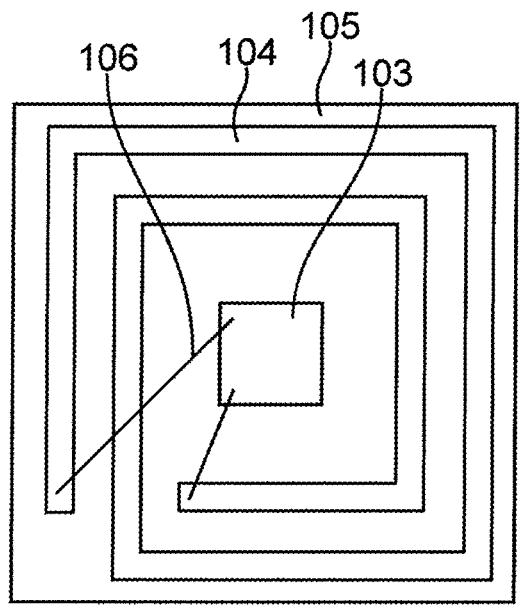
Figure 14C:
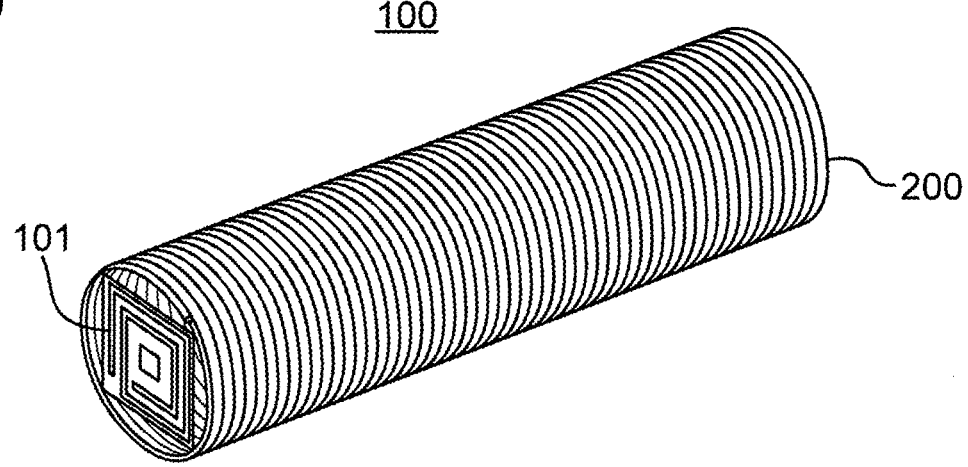

FIG. 11 is a schematic diagram of the circuit configuration of a power feeding module 1A in an RFID tag of the second embodiment. As shown in FIG. 11, the power feeding module 1A in the second embodiment has a configuration for an inductance value (L1) of a first power feeding coil 7A and an inductance value (L2) of the second power feeding coil 8A to be different from each other.

For the RFID tag of the second embodiment, a configuration is established according to which the detection frequency bandwidth can be set to be in a desired range by varying the ratios of the inductance values (L1 and L2) of the first power feeding coil 7A and the second power feeding coil 8A.

Third Exemplary Embodiment

An RFID tag of the third exemplary embodiment according to the present disclosure will be described with reference to accompanying FIGS. 12(a) and 12(b). The RFID tag of the third embodiment differs from the RFID tag 10 of the above first embodiment in the configuration of a power feeding module 1B. In the RFID tag of the third embodiment, the configuration except the power feeding module 1B is same as that of the RFID tag 10 of the first embodiment. In the description for the third embodiment, elements having the substantially same functions and the substantially same configurations as those of the first embodiment are given the same reference numerals. The basic operation in the third exemplary embodiment is same as the basic operation in the first embodiment described above, and the points different from the first embodiment will therefore be mainly described in the third embodiment.

FIGS. 12(a) and 12(b) are schematic perspective diagrams of the configuration of the power feeding module 1B embedded inside the RFID tag 10 of the third embodiment.

To facilitate understanding of the configuration of the power feeding module 1B in the third embodiment, in FIG. 12(a), a resin block portion 32 and a printed circuit board portion 33 are depicted in the upper portion thereof and a configuration having the resin block portion 32 and the printed circuit board portion 33 integrated with each other as the power feeding module 1B is depicted in the lower portion thereof. In FIG. 12(a), the internal configuration is depicted as seen through the resin material of the resin block portion 32.

In FIG. 12(b), one of plural hoop materials 30 embedded in the resin block portion 32 is depicted. The hoop material 30 is formed by folding a metal thin plate of a conductive material into an angular U-shape. In FIG. 12(a), for convenience, an x-axis, a y-axis, and a z-axis are depicted that intersect each other at right angles, and the longitudinal direction (an x-direction), the width direction (a y-direction), and the height direction (a z-direction) of the power feeding module 1B may be descried using the x-axis, the y-axis, and the z-axis, in the third embodiment.

As shown in FIG. 12(a), a conducting wire pattern 16 is formed on a first principal surface (an upper face side principal surface) of a printed circuit board 14B in the printed circuit board portion 33. The RFIC element 3 to be the IC chip is mounted in the substantial center of the printed circuit board 14B in the longitudinal direction thereof. As above, the RFIC element 3 is mounted on the first principal surface of the printed circuit board 14B and the conductor pattern 16 is formed on both sides thereof.

The plural hoop materials 30 electrically connected to the conductor pattern 16 of the printed circuit board 14B are disposed in parallel to each other along the longitudinal direction of the power feeding module 1B and are embedded in a resin block 15B. The hoop material 30 having the angular U-shape is embedded in the resin block 15B such that portions on the printed circuit board side (the lower side in FIG. 12) thereof constitute both end portions 30a and the hoop material 30 forms a gate-like shape. The plural hoop materials 30 are disposed in parallel to each other in a line at specific intervals such that the opening portions thereof are oriented in the same direction in the longitudinal direction (the x-direction) of the power feeding module 1B. The resin block 15B includes a hard resin material such as a thermosetting resin represented by an epoxy resin material.

The both end portions 30a of each of the plural hoop materials 30 arranged and disposed as above are each electrically connected to one of land patterns 16e of the top face side conductor pattern 16 of the printed circuit board 14B. The top face side conductor pattern 16 is formed such that the power feeding coils are formed, by connecting each of the both end portions 30a of the plural hoop materials 30 to any one of the land patterns 16e.

FIG. 13 illustrates diagrams of the resin block 15B of the resin block portion 32. In FIG. 13, (a) depicts the top face, (b) depicts a side face that extends in the longitudinal direction (the x-direction), and (c) depicts a bottom face. Moreover, sections (d) and (e) of FIG. 13 depict the end faces to be both sides of the resin block 15B.

As depicted in face (c) of FIG. 13, the resin block 15B having the plural hoop materials 30 embedded therein has a long hole portion 31 formed extending in the longitudinal direction (the x-direction) on the bottom face thereof (the face on the side of the printed circuit board). On the bottom face of the resin block 15B, the both end portions 30a of the hoop materials 30 are exposed on the outer edge portion surrounding the long hole portion 31. The long hole portion 31 forms a hollow space that extends in the longitudinal direction (the x-direction) when the resin block portion 32 is integrated with the printed circuit board portion 33 (see, e.g., FIG. 12(a)). This hollow space (31) forms a space that accommodates therein the RFIC element 3 mounted on the printed circuit board 14B.

When the resin block portion 32 is integrated with the printed circuit board 33 and the power feeding module 1B is thereby formed as above, the both end portions 30a of each of the plural hoop materials 30 disposed in parallel to each other are electrically connected to the land patterns 16e of the upper face side conductor pattern 16 formed on the printed circuit board 14B. The first power feeding coil 7B and the second power feeding coil 8B are arranged and disposed on both sides of the RFIC element 3 in the longitudinal direction in the power feeding module 1B, by electrically connecting the plural hoop materials 30 and the upper face side conductor pattern 16 to each other as above. As shown in FIG. 12(a), the first power feeding coil 7B and the second power feeding coil 8B are arranged and disposed on both sides of the RFIC element 3 to be the IC chip, and the coil central axes of the first power feeding coil 7B and the second power feeding coil 8B are formed to be substantially same. The winding axes of the first power feeding coil 7 and the second power feeding coil 8 are disposed on the substantially same axis.

In the power feeding module 1B of the third embodiment, the two input and output terminals of the RFIC element 3 to be the IC chip are connected to the proximal ends of the first power feeding coil 7B and the second power feeding coil 8B (i.e., the end portions thereof proximal to the RFIC element 3). On the other hand, the distal ends of the first power feeding coil 7B and the second power feeding coil 8B are electrically connected to each other through an inter-layer connection conductor by the lower face side conducting wire pattern (not depicted) that is formed on the lower face of the printed circuit board 14B.

As above, the power feeding module 1B of the third embodiment has the configuration according to which the first power feeding coil 7B and the second power feeding coil 8B are formed on both sides of the RFIC element 3 to be the IC chip, by the plural hoop materials 30, the wire patterns formed on the printed circuit board 14B, and the inter-layer connection conductor that electrically connects the wire patterns on the upper face side and the lower face side to each other. For the power feeding module 1B of the third embodiment, significant simplification of the production process can therefore be facilitated compared to the style for the power feeding coils to be constituted using the metal pins.

The exemplary RFID tag according to the present disclosure has been described as above with reference to the specific examples in the first embodiment to the third embodiment, and the RFID tag is a radio communication tag using the elastically deformable spring as the emission body and has the configuration having the high communication capacity.

In each of the first embodiment to the third embodiment, the configuration is established according to which the power feeding module is disposed inside the spring to cause the spring to function as the antenna booster for the power feeding module and the protective function for the power feeding module is imparted to the spring. As the present invention, however, the configuration only has to be established according to which the spring is coupled through a magnetic field with the power feeding coils of the power feeding module and the spring is caused to function as the antenna booster for the power feeding module, and the configuration for the power feeding module to be arranged and disposed on the outer side of the spring to be couple through a magnetic field therewith may be established as a modification example.

The RFID tag to be the radio communication tag according to the present invention has the configuration according to which, to supply the high frequency signal to the spring (2), the two power feeding coils (7, 7A, 7B, 8, 8A, and 8B) are disposed on the power feeding module (1, 1A, and 1B) to facilitate the widening of the band. Any variation of the communication property (the reading property) of the RFID tag (10) itself can therefore be suppressed to its minimum even when the spring (2) disposed in the vicinity of the power feeding module (1, 1A, and 1B) is deformed, and the highly reliable radio communication tag is therefore established.

The RFID tag of the present invention has the configuration according to which the power feeding circuit (1, 1A, and 1B) to supply the high frequency signal to the spring (2) or to receive the high frequency signal from the spring (2) is not directly connected to the spring (2) and is couple through a magnetic field therewith, and has the structure that avoids direct transmission of any vibration, any impact, and the like from the exterior of the RFID tag (10) to the power feeding circuit (1, 1A, and 1B). The configuration is therefore established for IC chip (3) itself, the connection portions between the IC chip (3) and the wire patterns, and the like that are relatively weak against any impact force and the like are reliably protected from any vibration, any impact, and the like from the exterior.

The first power feeding coil (7) and the second power feeding coil (8) forming the power feeding circuit in the power feeding module (1, 1A, and 1B) have the substantially same configuration and the winding axes in the same direction. The first power feeding coil (7, 7A, and 7B) and the second power feeding coil (8, 8A, and 8B) have the winding axes in the same direction as that of the winding axis of the spring (2). The RFID tag of the present invention configured as above has the configuration according to which the power feeding can highly efficiently be executed and downsizing of the overall radio communication tag can be facilitated.

In the RFID tag of the exemplary embodiments, the power feeding module (1, 1A, and 1B) including the power feeding circuit is integrated in the block of the hard resin such as a thermosetting resin to be formed as the module, and the RFIC element itself, the connection points between the RFIC element (3) and the power feeding coils (7, 7A, 7B, 8, 8A, and 8B), the wire patterns, and the like are therefore reliably protected to establish a highly reliable radio communication tag.

For the power feeding module in the RFID tag of the exemplary embodiments, the configuration is established according to which, in the closed circuit of the power feeding circuit, when the used frequency band is the UHF band, the power feeding coils (7, 7A, 7B, 8, 8A, and 8B) are disposed in the vicinity of the maximal current point that is most distant from the RFIC element (3) to be the power feeding element. The RFID tag of the present invention has the configuration that enables a highly efficient power feeding operation to be executed for the spring (2) by configuring as above.

The RFID tag of the present invention has the configuration that includes the RFIC element and the power feeding coils (the coil antennas) connected to the RFIC element, and is established as an information medium with which highly precise reading and writing of data in the incorporated memory can be executed using a radio wave (an electromagnetic wave) or a magnetic field.

It should be appreciated that the present invention includes combining as necessary any optional embodiment(s) and/or any optional modification example(s) with each other, of the above embodiments and/or the above modification examples, and those configured in this manner can each achieve the effects to be achieved by such embodiment(s) and/or modification example(s).

The RFID tag of the exemplary embodiments of the present disclosure provides for a radio communication tag for which reduction of the weight and the size thereof is facilitated, that has a desired communication distance, and that is applicable to a deformable article to be highly versatile.

EXPLANATIONS OF LETTERS OR NUMBERS 1 power feeding module
2 spring
3 RFIC element
4 wire pattern
5 first power feeding block
6 second power feeding block
7 first power feeding coil
8 second power feeding coil
10 RFID tag
11 first connection conductor
12 second connection conductor
13 third connection conductor
14 printed circuit board
15 resin block
16 upper face side conductor pattern (second conductor pattern)
17 lower face side conductor pattern (third conductor pattern)
18 via hole conductor
19 metal pin
20 top face side conductor pattern (first conductor pattern)
21 protective layer

What is claimed:

1. An RFID tag comprising:
an RFIC element comprising a first input and output terminal and a second input and output terminal;
a first power feeding coil having a first end connected to the first input and output terminal of the RFIC element;
a second power feeding coil having a first end connected to a second end of the first power feeding coil and having a second end connected to the second input and output terminal of the RFIC element; and
a spring-shaped antenna that comprises a first region coupled through a magnetic field with the first power feeding coil and a second region coupled through a magnetic field with the second power feeding coil,
wherein the first region and the second region are consecutively disposed from each other through a region therebetween having an inductance component, and
wherein the first power feeding coil and the second power feeding coil are disposed inside the spring-shaped antenna.

2. The RFID tag according to claim 1, wherein the first and second power feeding coils each comprise a winding axes that extend in a same direction and are parallel to a winding axis of the spring-shaped antenna.

3. The RFID tag according to claim 1, wherein the RFIC element, the first power feeding coil, and the second power feeding coil are embedded integrally with each other in a block of a hard resin inside the spring-shaped antenna.

4. The RFID tag according to claim 1, wherein the RFIC element, the first power feeding coil, and the second power feeding coil are embedded integrally with each other in a block of a hard resin.

5. The RFID tag according to claim 4, wherein the block of the hard resin and at least a portion of the spring-shaped antenna are integrated with each other by a flexible resin material.

6. The RFID tag according to claim 4, wherein the block of the hard resin and the first and second regions of the spring-shaped antenna are integrated with each other by a flexible resin material.

7. The RFID tag according to claim 1, wherein the RFIC element is disposed in a closed circuit with the first and second power feeding coils connected to each other through connection conductors, such that the RFIC element is disposed between the first power feeding coil and the second power feeding coil.

8. The RFID tag according to claim 7, wherein the first and second power feeding coils each comprise a winding axes that extends in a same direction and are parallel to a winding axis of the spring-shaped antenna.

9. The RFID tag according to claim 8, wherein, in the closed circuit, the first input and output terminal of the RFIC element is connected to a distal end of the first power feeding coil through a first connection conductor and the second input and output terminal of the RFIC element is connected to a distal end of the second power feeding coil through a second connection conductor.

10. The RFID tag according to claim 9, wherein in the closed circuit, proximal ends of the first power feeding coil and the second power feeding coil are connected to each other through a third connection conductor.

11. The RFID tag according to claim 10, wherein the third connection conductor comprises a line path shorter than each of the first and second connection conductors, with a linear current path that bypasses the RFIC element.

12. The RFID tag according to claim 1, wherein the spring-shaped antenna comprises a stainless spring material and is configured as an antenna booster for the RFIC element.

13. An RFID tag comprising:
an RFIC element comprising first and second input and output terminals;
a first power feeding coil having coupled to the first input and output terminal of the RFIC element and having a winding axis extending in a first direction;
a second power feeding coil coupled to the second input and output terminal of the RFIC element and having a winding axis extending in the first direction; and
a spring-shaped antenna surrounding the first and second power feeding coils and having a winding axis extending in the first direction,
wherein the spring-shaped antenna comprises a first region magnetically field coupled with the first power feeding coil and a second region magnetically field coupled with the second power feeding coil, such that the spring-shaped antenna is configured as an antenna booster for the RFIC element, and
wherein the first power feeding coil and the second power feeding coil are disposed inside the spring-shaped antenna.

14. The RFID tag according to claim 13, wherein the first and second regions of the spring-shaped antenna are consecutively present from each other through a region therebetween having an inductance component.

15. The RFID tag according to claim 13, wherein the RFIC element, the first power feeding coil, and the second power feeding coil are embedded integrally with each other in a block of a hard resin.

16. The RFID tag according to claim 15, wherein the block of the hard resin and at least a portion of the spring-shaped antenna are integrated with each other by a flexible resin material.

17. The RFID tag according to claim 13, wherein the RFIC element is disposed in a closed circuit with the first and second power feeding coils connected to each other through connection conductors, such that the RFIC element is disposed between the first power feeding coil and the second power feeding coil.

18. The RFID tag according to claim 17, wherein, in the closed circuit, the first input and output terminal of the RFIC element is connected to a distal end of the first power feeding coil through a first connection conductor and the second input and output terminal of the RFIC element is connected to a distal end of the second power feeding coil through a second connection conductor.

19. The RFID tag according to claim 18,
wherein in the closed circuit, proximal ends of the first power feeding coil and the second power feeding coil are connected to each other through a third connection conductor, and
wherein the third connection conductor comprises a line path shorter than each of the first and second connection conductors, with a linear current path that bypasses the RFIC element.

* * * * *